United States Patent [19]

Noland

[11] 4,022,595

[45] May 10, 1977

[54] SELF-CLEANING FILTER ARRANGEMENT

[75] Inventor: Richard D. Noland, Overland Park, Kans.

[73] Assignee: Air-O-Matics, Inc., Kansas City, Mo.

[22] Filed: Jan. 30, 1976

[21] Appl. No.: 653,885

[52] U.S. Cl. .................... 55/273; 55/283; 55/287; 55/294; 55/302

[51] Int. Cl.² ........................... B01D 46/04

[58] Field of Search ............ 55/96, 273, 283, 284, 55/285, 286, 287, 288, 294, 298, 302

[56] References Cited

UNITED STATES PATENTS

| 2,723,726 | 11/1955 | Pellon | 55/287 |
|---|---|---|---|
| 2,844,216 | 1/1958 | Swanson | 55/287 |
| 2,974,748 | 3/1961 | Swanson | 55/287 |
| 2,976,953 | 3/1961 | Haas et al. | 55/287 |
| 3,097,936 | 7/1963 | Lincoln | 55/287 |
| 3,277,633 | 10/1966 | Smoot | 55/302 |
| 3,487,609 | 1/1970 | Caplan | 55/96 |
| 3,491,518 | 1/1970 | Williams | 55/284 |
| 3,695,007 | 10/1972 | Farnworth | 55/294 |
| 3,793,811 | 2/1974 | Bourne | 55/294 |
| 3,854,910 | 12/1974 | Hammerquist | 55/302 |

*Primary Examiner*—Frank W. Lutter
*Assistant Examiner*—David L. Lacey
*Attorney, Agent, or Firm*—Fishburn, Gold & Litman

[57] ABSTRACT

A filtering device is disclosed for removing particulate solids from a continuously flowing gas stream and which comprises a filter chamber that contains filter bags from which filtered gas is discharged into a plurality of plenum chambers arranged in a radial pattern around the axial center line of the filter. A pressure blower for a cleaning gas is located centrally with respect to the plenum chambers, and the casing of the blower is intermittently revolvable and has an outlet which sequentially falls into alignment with outlets in the plenum chambers through which filtered gas normally flows outward, but through which the cleaning gas is injected inwardly when aligned with the outlet of the blower casing, thereby providing means for intermittently reversing the gas flow in the filter bags and momentarily generating a pressure therein which is greater than exists in the filter chamber. This results in flexing of the bags and reverse flow of gas through their walls for dislodging filter cake which accumulates thereon.

5 Claims, 8 Drawing Figures

SELF-CLEANING FILTER ARRANGEMENT

BACKGROUND OF THE INVENTION

The present invention pertains broadly to bag filters for removal of particulate solids which are entrained in gas stream and pertains more particularly to continuous operation gas filters which are self-cleaning by back-pressuring or reverse flow of a cleaning gas through the walls of the bags.

During continuous operation of a bag filter for removal of entrained solids from a gas stream, a cake of the filtered solids eventually builds up on the walls of the bags and must be periodically removed therefrom lest the bags blind over and become so impermeable as to prevent continued filtration of the gas at a desired rate. Various bag filters have thus been developed whereby gas to be filtered is passed through the wall of the filter bags from the inside to the outside, and a cleaning gas is perriodically injected into the interior of the bags to create a pressure therein which is higher than exists in the filter chamber which contains the bags, thereby causing the bags to flex outward and effecting flow of a gas through the walls thereof in a direction in reverse to that in which the gas being filtered normally flows through the walls, thus dislodging accumulated filter cake therefrom.

Exemplary versions of reverse flow, self-cleaning bag filters as have just been broadly described are disclosed in U.S. Pat. Nos. 2,974,478; 3,277,633; 3,487,609; 3,648,442 and 3,793,811. While each of the filters disclosed and claimed in these patents represents a noteworthy advancement in the state of the bag filtering art, they nonetheless suffer the disadvantage of requiring equipment which is comlicated and expensive to install and/or operate for supplying cleaning gas to the filter bags, e.g. gas compressors, solenoid valves, electrical controls, moving gas manifolds, chain drivers, mechanical gas valves, etc.

One principal object of the present invention is, therefore, to provide a self-cleaning bag filter of the reverse flow type whereby the aforesaid disadvantages are avoided.

Another object is to provide a self-cleaning, reverse flow bag filter having a greatly simplified and compact means for intermittent reverse flow of a cleaning gas to the filter bags.

Still another object is to provide a self-cleaning, reverse flow bag filter having means for intermittent reverse flow of cleaning gas to the filter bags whereby a quick thrust of pressurized cleaning gas is intermittently supplied to the bags to that they are rapidly flexed outward and also whereby the thrust is retained for a preestablished interval of time to allow reverse passage of cleaning gas through the walls of the bags for separation of particles from the exterior surfaces thereof.

Yet another object is to provide a self-cleaning bag filter of the reverse flow type which is equipped with a plurality of plenum chambers, with filtered gas normally being fed into each plenum chamber from at least one filter bag, and wherein cleaning gas is intermittently charged into each plenum chamber to momentarily generate a pressure therein which is greater than that which exists in the filter chamber that contains the bags.

Other objects and advantages of the present invention will become apparent from the following description and the appended claims.

SUMMARY OF THE INVENTION

The present invention is a bag filter which comprises a filter chamber, a plurality of plenum chambers, and a reverse flow means for cleaning the bags of the filter. The filter chamber is adapted to contain a multiplicity of bags therein for passage of gas to be filtered from the outside to the inside of the bags. Each plenum chamber has an outlet through which filtered gas is normally discharged therefrom, and there is at least one inlet in each plenum chamber through which filtered gas enters from a filter bag. Cleaning gas is intermittently charged into each plenum chamber by the reverse flow means to generate and momentarily maintain a pressure therein which is greater than that which exists in the filter chamber.

In advantageous embodiments of the invention, the plenum chambers can be arranged in a radial pattern with respect to the axial center line of the filter chamber, and the reverse flow means can be a pressure blower comprising a gas propelling rotor and a casing therefor which are centrally located with respect to the radially patterned plenum chambers. Accordingly, the casing can have an inlet for the cleaning gas and a tangential outlet therefor, and the casing can be revolvable by expulsion of cleaning gas from the outlet therein, and the casing can be adapted for intermittent revolution for sequential injection of the cleaning gas into the plenum chambers through the outlets therein.

DESCRIPTION OF PREFERRED AND ALTERNATIVE EMBODIMENTS

The bag filter of the present invention can be employed for removing particulate solids from a gas stream in all cases wherein the particulate solid can be removed, with safety and practicality, by bag filtration from the gas in which it is entrained. Dust and product powders can thus be removed from air, and product powders and ash, for example, can be removed from flue gases or other process gases generated or employed during processing procedures, and wherein the particulate solids are collected by means of the bag filter as a product or as a waste material which should not be indiscriminately discharged into the atmosphere.

Any gas can be employed as a cleaning gas provided it can be safely mixed with the gas being filtered and also the particulate solid being separated therefrom, and further provided that the cleaning gas is not objectionably reactive otherwise with the gas being filtered, the entrained solid, or the materials from which the bag filter is constructed. It will be understood that the cleaning gas can be the same as the gas being filtered, and that the filtered gas can be recycled as cleaning gas. The gas which flows in reverse direction of the walls of the bags can be either the cleaning gas, filtered gas within the bags which is forced through the walls thereof by injection of the pressurized cleaning gas, or a mixture of the cleaning gas and the filtered gas.

Figure 1:
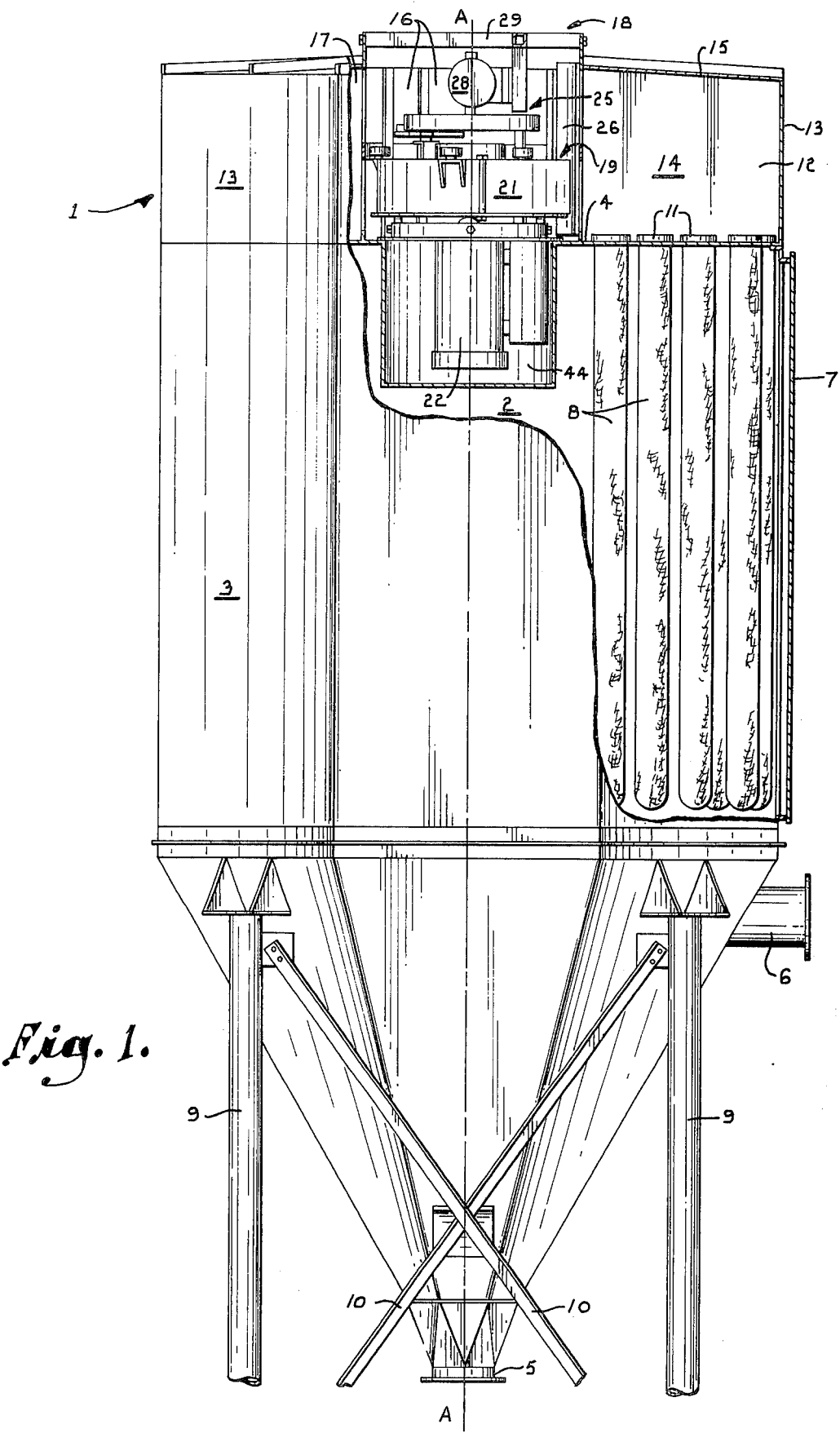
FIG. 1 is a partially sectional side view of a bag filter constructed in accordance with the present invention.
Figure 2:
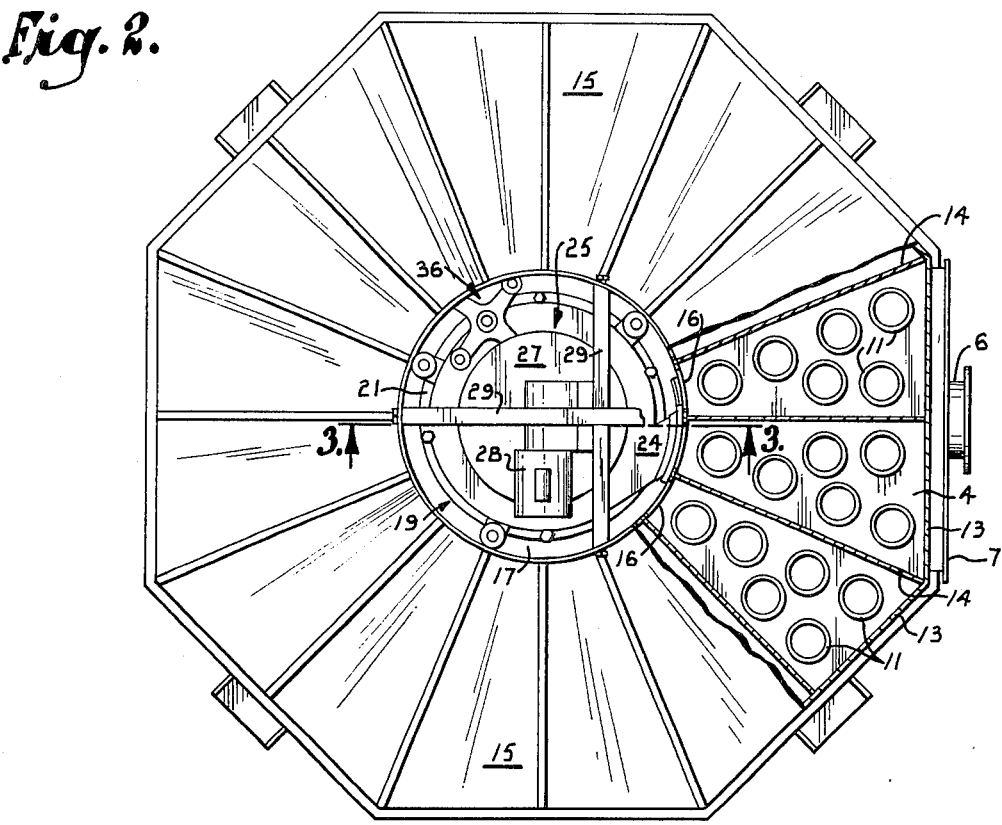
FIG. 2 is a partially sectional top view of the bag filter shown in FIG. 1.

Referring now to FIGS. 1 and 2, the bag filter generally represented at 1 comprises a filter chamber 2 enclosed by a side wall 3 and a top 4. The side wall is conical at the lower end of the filter chamber and merges into an outlet 5 through which filtered particulate solids are discharged from the chamber. Outlet 5 can be provided with a rotary gas lock, not shown, for preventing excessive discharge therefrom of the gas being filtered. The filter chamber 2 is also provided with an inlet 6 through which gas to be filtered is charged into the chamber. A door in side wall 3 is represented at 7 and provides access into the filter chamber for servicing filter bags 8 therein. The entire bag filter assembly is supported by means of upright legs 9 which are stabilized with cross braces 10.

The filter chamber contains a plurality of bags 8 which are suspended from the top 4 of the filter chamber, and the bags are prevented from collasping by means of rigid wire mesh cylinders, not shown, which are inserted therein. The interiors of the bags lead into nipples 11 which, in fact, are inlets for filtered gas into the plenum chambers 12 located above the filtering chamber 2. At least one inlet 11 leads into each plenum chamber 12, but each plenum can advantageously have a plurality of inlets as shown.

The plenum chambers are bounded by an end wall 13 having a cross-sectional configuration which conforms to the side wall 3 of the filter chamber, and by side walls 14, a top 15, and the top 4 of the filter chamber, which also functions as a floor for the plenum chambers. The plenum chambers are arranged in a radial pattern around the axial center line A—A of the filter chamber, and have outlets 16 through which filtered gas passes to a central outlet 17 and thence flows outward into the atmosphere. The plenum chamber outlets shown in FIGS. 1 and 2 extend over different planes yet each plane is generally parallel to center line A—A. In other embodiments of the present filter the plenum chamber outlets can extend over planes which are generally transverse with regard to center line A—A, e.g. the outlets can be located in the top 15.

Figure 3:
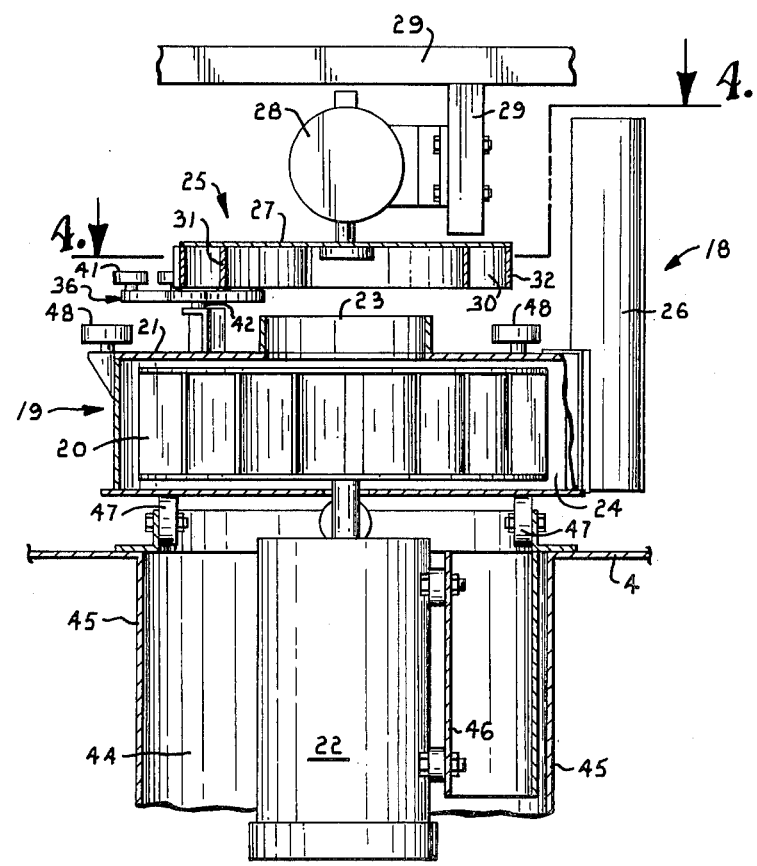
FIG. 3 is a partially sectional side view taken along the line 3—3 of FIG. 2 and shows the cleaning-gas reverse flow means used with the bag filter shown in FIGS. 1 and 2.

Reverse flow means for supplying pressurized cleaning gas to the plenum chambers and the attached bags is generally represented at 18 in FIGS. 1–3. Accordingly, a cleaning gas is injected into the plenum chambers under pressure to flex the attached bags and to purge the walls thereof as previously described. The reverse flow means shown in the drawings comprises a pressure blower, generally represented at 19, having a gas propelling rotor 20 and a casing 21 therefor which are centrally located with respect to the central axis A—A of the filter chamber. The rotor 20 is turned by means of a stationarily mounted electric motor 22, and the revolvable blower casing is provided with an inlet 23 for the cleaning gas and also a tangential outlet 24 therefor. The blower casing 21 is revolvable by expulsion of the cleaning gas therefrom through the tangential outlet 24 therein and revolution of the casing is controlled by means of an interval timer mechanism, generally represented at 25, whereby the casing 21 revolves incrementally and intermittently so that cleaning gas is expelled from the casing outlet 24 and is sequentially injected into the plenum chambers through outlets 16 therein.

Although the reverse flow means shown in FIGS. 1–8 is a preferred embodiment of the invention, other reverse flow means can also be employed. The outlets 16 of the plenum chambers can be located in the top 15 or the sidewalls 13 thereof and the reverse flow means can comprise covering members for impeding outflow of gas through the outlets of the plenum chambers during the charging of cleaning gas thereto. Accordingly, the cleaning gas can be charged to a plenum chamber from an individual entry point therein while the plenum chamber outlet is obstructed by its respective covering member.

Preferably, however, the covering member for the outlets of the plenum chambers is revolvable while including means combined therewith for injecting a cleaning gas into a plenum when the outflow of gas therefrom is impeded by the covering member, with the covering member being intermittently revolvable incrementally from the outlet of one plenum chamber to that of another, and with the outlet of each plenum chamber being located equidistantly outward from the axis of revolution of the covering member. When thus arranged, the outlet of each plenum chamber can, to advantage, extend over a different plane and with each plane being generally parallel to the axis of revolution of the covering member. To further advantage, the plenum chambers can be arranged in a radial pattern around the axis of revolution of the covering member, as shown in the drawings, with one form of cover member being represented at 26 therein. Additionally, the axis of revolution of the covering member can, to advantage, be coaxial with respect to the axial center line A—A of the filter chamber.

In especially preferred embodiments of the invention, the means for injecting a cleaning as into a plenum chamber includes a blower having a gas propelling rotor, a casing for the rotor, a cleaning gas inlet into the blower and an outlet for discharging cleaning gas therefrom, and wherein the outlet from the blower leads to and through said covering member for the outlets of the plenum chambers. In the drawings a distinct cover member is shown as an attached part of the centrifugal outlet 24 of the blower casing 21, but it will be understood that outlet 24 can be shaped and extended to align with and cover over the whole of a plenum outlet 16 so that use of a separately distinct covering member is obviated.

As shown in the drawings, the plenum chambers 12 are arranged in a radial pattern and are located outwardly from the axis of revolution of the covering member 26. The outlet 24 of the blower casing 21 is adapted for tangential discharge of a cleaning gas therefrom and the casing is revolvable by propulsion of the cleaning gas from the casing outlet. The covering member 26 is thus conveyed in a circular path from the outlet of one plenum chamber to the outlet of another upon intermittent incremental revolution of said casing. Also, in the illustrated bag filter, the axes of revolution of the casing 21 and the covering member 26 are coaxial.

Figure 4:
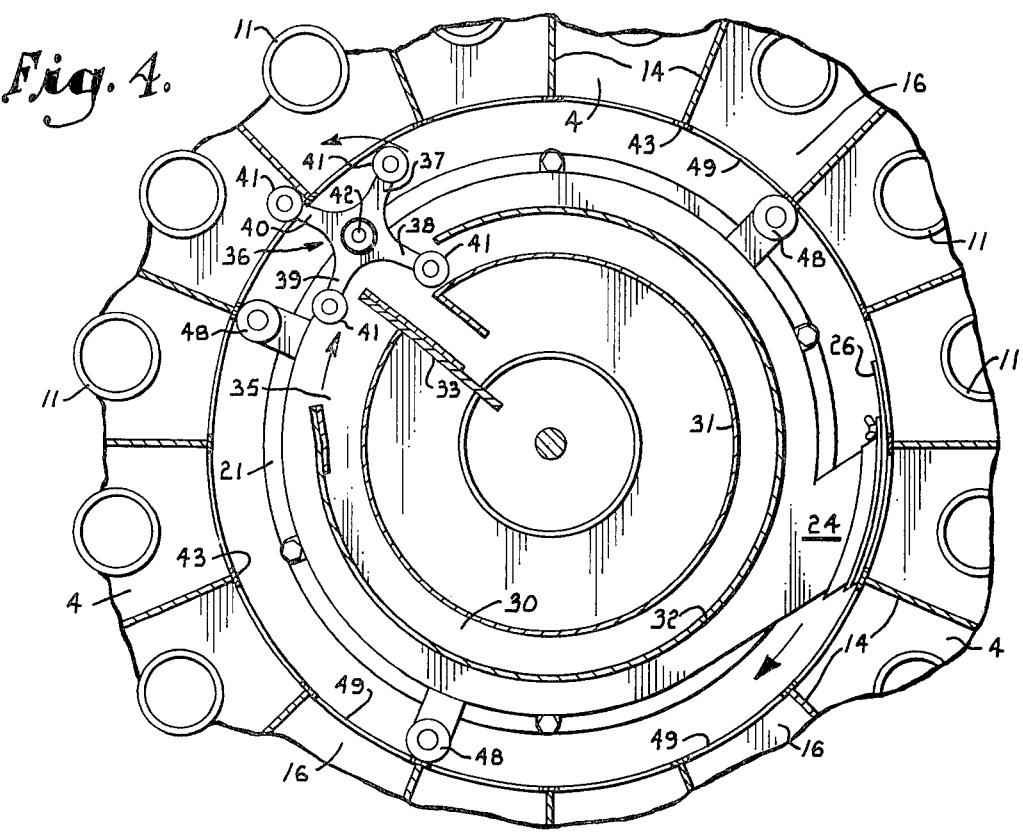
FIG. 4 is a top view of the reverse flow means taken along line 4—4 of FIG. 3, illustrating the interval timing means thereof in section and showing the rotary cross bar of the timer just prior to the reindexing thereof.
Figure 5:
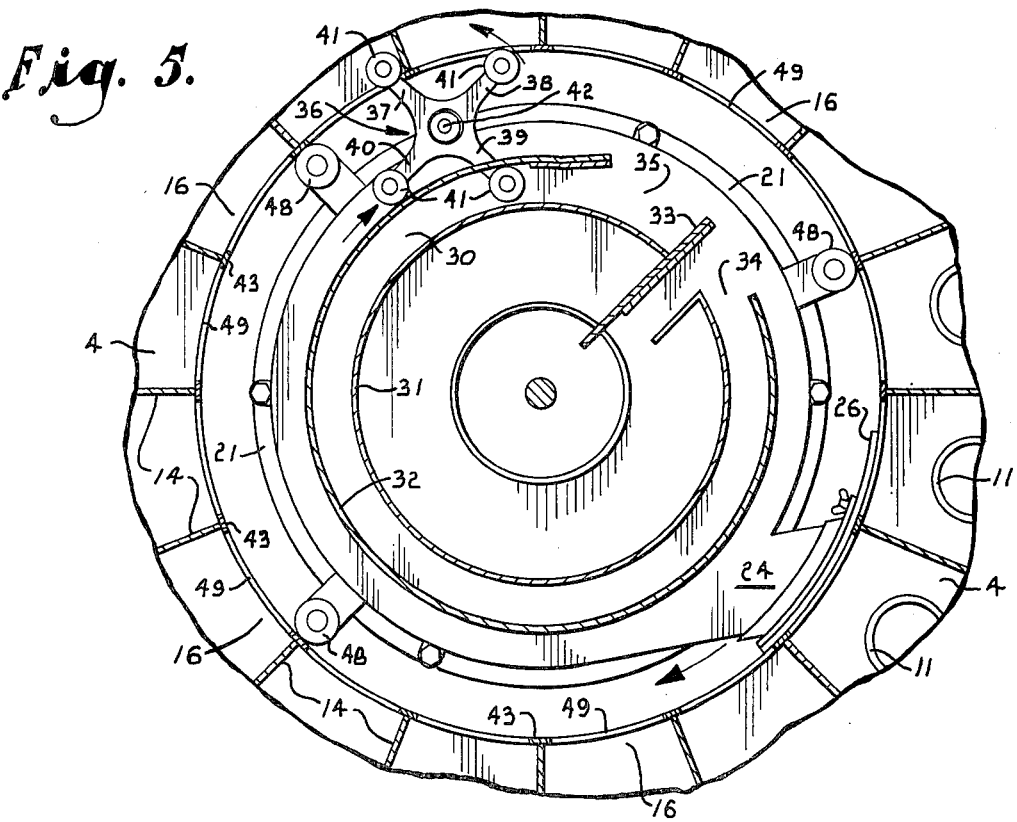
FIG. 5 is the same as FIG. 4 except that the cross bar is shown following the reindexing thereof as well as the shift in registry of the tangential blower outlet from the outlet of one plenum chamber to the outlet of an adjacent plenum chamber.
Figure 6:
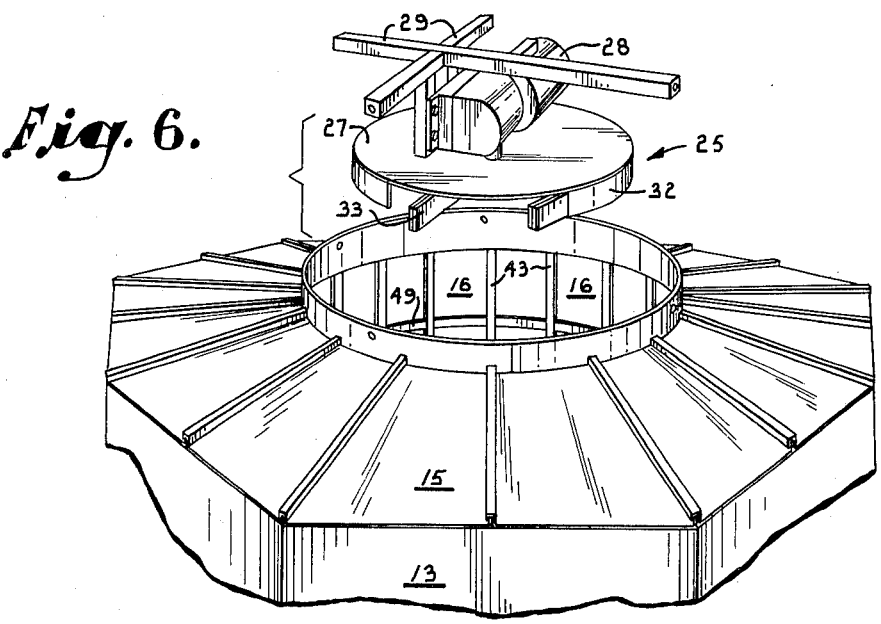
FIG. 6 is an exploded view of the top portion of the bag filter shown in FIGS. 1 and 2 and illustrates the outlets of the radially arranged plenum chambers and the mounting arrangement of the interval timer centrally with respect to the plenum chambers.

The desired intermittent incremental revolution of the reverse flow means for sequential injection of cleaning gas into the plenum chambers, for preestablished intervals of time, can be effected by means of a mechanical interval timer such as is generally represented at 25 in the drawings and which is shown in greater detail in FIGS. 3, 4 and 5. As illustrated therein, the interval timer comprises a circular plate 27 which is coaxially aligned and coaxially rotated with respect to the blower casing 21 by means of a gear motor 28 stationarily mounted to the top of the filter by means of supporting frame members 29. The interval timer further comprises a circular track 30 which is coaxial with respect to the revolution axis of the blower casing 21, and the track is bounded by an inner side wall 31 and an outer side wall 32. A striker plate 33 extends transversely across the path of track 30, and the outer side wall 32 has gates 34 and 35 therein adjacent each side of the striker plate. The track and the striker plate are attached to plate 27 and are thus corotatable upon operation of the gearmotor 28. A cross bar 36 has radially extending arms 37, 38, 39, and 40 with track followers 41 thereon, the cross bar 36 eing rotatably attached to blower casing 21 by means of a pivot pin 42, and being rotated by engagement with the striker plate 33 during rotation thereof upon rotation of plate 27. A plurality of indexing members 43 are located adjacent the outlets 16 of the plenum chambers so that one of said indexing members 43 engages an arm of the cross bar when the track follower of an opposing arm is engaged in the track 30, the cross bar being nonrotatable when the arms of the cross bar are thus engaged.

Upon rotation of the track 30 and striker plate 33, the cross bar is rotated by engagement with the moving striker plate, and a track follower 41 on an arm 38 of the cross bar is thus pushed out of one of the gates 34 and is hence untracked while an opposing arm 40 of the cross bar is being disengaged from one of said indexing members, thus allowing the casing to partially revolve until continued rotation of the track 30 and striker plate 33 effects insertion of the track roller on arm 39 into the track through the other gate 35 therein, along with simultaneous engagement of an opposing arm 37 with an indexing member adjacent to that previously engaged. Accordingly, the covering member 26 is aligned over an outlet of one of the plenum chambers when the blower casing is not revolving, and upon reindexing of the casing the covering member becomes aligned over the outlet of an adjacent plenum chamber. The covering member thus becomes aligned with the outlet of each plenum chamber in sequence as the track 30 and striker plate continue to revolve. The dwell time of the covering member over any particular plenum chamber outlet is equal to the time it takes for the track and striker plate to make one complete revolution, whereas the interval between one alignment of the covering member with the outlet of a particular plenum chamber and the next alignment therewith is equal, approximately, to the time required for the track and striker plate to make one complete revolution multiplied by the number of indexing members 43. The aforesaid dwell time and interval between alignments can be varied by altering the speed of the gearmotor, and the dwell time can be separately varied independently of the alignment interval by cyclically varying the speed thereof.

With the bag filter shown in the drawings the interval between alignment can, to advantage, be on the order of about one second with the dwell time at each plenum chamber outlet being about one second, and with about 16 to 17 seconds being required for the blower casing to make one full revolution for supplyig cleaning gas to all of the outlets. The differential of pressure between the interior and the exterior of the filter bags when supplying cleaning gas to the plenum chambers is subject to variation depending on the porosity of the bags, of the difficulty of dislodging the filter cake, etc., but a pressure differential of several inches of water is usually sufficient. Other timing intervals and pressure differentials can be employed as needed for maintaining flow of gas through the bags at a preferred rate during filtering.

Interval timing means other than that shown in the drawings can be employed where such is preferable and practical. Electrically controlled timing means can, for examle, be employed as an alternative, as can either internal or external Geneva movements. The illustrated timing means is preferred, however, since it is relatively simple, inexpensive, and trouble-free with regard to achieving the aforestated objects of the invention.

It will be understood that the interval timing means 25 shown in the drawings is adaptable for use with various types of bag filters provided with a reverse flow means whereby a cleaning gas is injected into the interior of the bags so that the pressure therein becomes greater than the exterior pressure, and whereby the bags are flexed and a reverse flow of gas through the walls of the bags is effected. The presently disclosed interval timer means is thus not restricted to use only with such other bag filtering apparatus as has been disclosed herein.

Other details of the presently disclosed reverse flow and interval timing means can be found in FIGS. 3–5 and 7–8. The blower motor 22 resides in a well 44 in the top 4 of the filter chamber 2. The blower motor is stationarily mounted to the wall 45 of the well by means of a bracket 46. Rollers 47 are mounted at the top outer edge of the well and abut the casing 21 of the blower so that it is vertically supported without seriously impeding the rotatability thereof. Similarly, rollers 48 are affixed to the upper outer edge of the blower casing 21, and these rollers engage a girth ring 49 and stabilize the casing against lateral movement during the rotation thereof.

Figure 7:
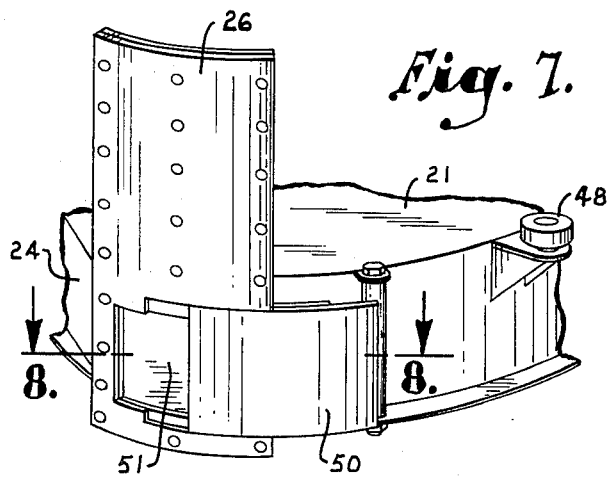
FIG. 7 is a sectional isometric view of the blower casing and covering member of the reverse flow means of FIG. 4.
Figure 8:
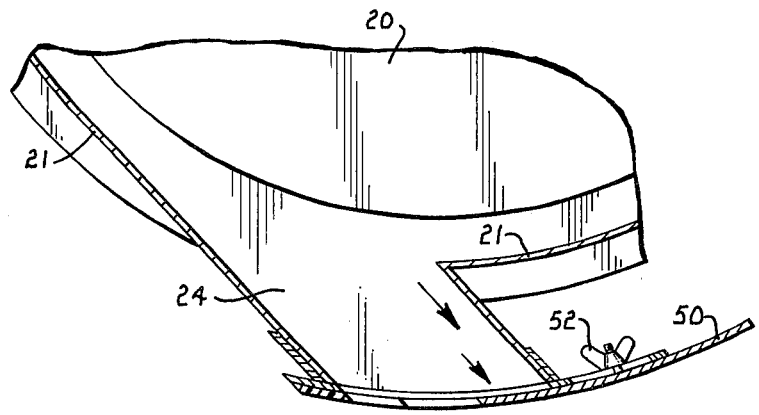
FIG. 8 is a sectional top view of the blower casing and covering member taken along line 8—8 of FIG. 7.

In FIGS. 7 and 8 the covering member 26 on blower outlet 24 is shown in greater detail. The covering member 26 is wider and taller than the outlet 24 so that plenum outlets are fully covered when the cover member registers with the outlet. A sliding gate 50 provides means whereby the discharge opening 51 from outlet 24 can be varied in size in order to control the rate at which cleaning air is discharged from the blower. The gate is held in place by means of wing-nut 52 once the gate has been positioned as desired. As was previously indicated, the blower outlet 24 can be configured to fully cover the plenum chamber outlets so that the need for the cover member 26 is obviated. Accordingly, the discharge rate of cleaning air from opening 50 can be regulated by means of a butterfly valve located in outlet 24. Alternatively, covering members having other configurations adapted to differently sized or configured plenum discharge outlets can be used.

The drawings illustrate a bag filter wherein the plenum chambers 12 are located above the bag filter, but it will be understood that the plenum chambers could also be located below the filter chamber while providing an alternative means for removing filtered solids therefrom. Furthermore, the use of a pressure blower located centrally of the radially arranged plenum chamber has been described and shown as a reverse flow means for supplying cleaning gas to the plenum chambers and the attached bags, but in alternative embodiments of the invention only the casing 21, or an equivalent thereof, need be located centrally with respect to the plenum chambers since the means for pressurizing the cleaning gas can be remotely located while using a suitable interconnecting conduit for conveying the cleaning gas to the casing. In still other embodiments of the invention the cleaning gas can be supplied to the plenum chambers by means of a manifold having inlet conduits which lead into each chamber while using electrically operated valves for opening and closing the conduits for intermittent supply of cleaning gas to the chambers. Similarly, the plenums can have outlet conduits leading from each chamber and each outlet can have an electrically operated valve for control of gaseous outflow from each plenum chamber. Accordingly, opening and closing of the electrically operated valves at the proper time can be accomplished through use of electrical control means.

A self-cleaning bag filter which achieves the aforestated objects has thus been disclosed in detail, and although the invention has been described with reference to specific apparatus, arrangements thereof, types of gases, operating conditions and the like, it will nonetheless be understood that even other embodiments will become apparent which are within the spirit and scope of the invention defined in the following claims.

What is claimed and desired to secure by Letters Patent is:

1. In a bag filter device having a housing defining a filter chamber having an inlet and an outlet and a plurality of filter bags therein each positioned in a gas flow path for passage of a gas to be filtered from the outside to the inside of the bags, said bag filter device having wall means flow-connected to said filter chamber and defining a plurality of plenum chambers, one of said wall means of each of said plenum chambers having means defining at least one inlet through which filtered gas enters from a respective filter bag, one other of said wall means of each of said plenum chambers having an outlet through which filtered gas is normally discharged therefrom, means for directing cleaning gas intermittently into each of said plenum chambers to generate and momentarily maintain a pressure therein which is greater than that which normally exists in said filter chamber and comprising:

a rotatable blower casing having a gas inlet and a tangential gas outlet, said tangential outlet during rotation thereof being sequentially alignable with an outlet of each of said plurality of plenum chambers, blower means directing gas into said casing inlet and out said casing tangential outlet providing reverse gas to clean said bags, a plurality of spaced rollers mounted between said plenum chamber wall means and said blower casing and supporting said blower casing for free rotation in response to the tangential discharge of gas from said casing tangential outlet, c. wall means positioned around said blower casing and defining a circular track, power means for rotating said circular track; and d. ratchet means rotatably mounted on said blower casing and having portions thereof sequentially movable into and out of said circular track upon rotation of said track, said ratchet means having other portions thereof movable into and out of engagement with the spaced plenum chamber outlet defining wall means upon rotation of said circular track and movement of said ratchet means portions into and out of said circular track, thereby intermittently retaining said blower casing tangential outlet in communication with a respective one of the plenum chamber outlets and then permitting movement of same under the urging of said tangential discharge to communicate with an adjacent one of the plenum chamber outlets.

2. In a bag filter device as set forth in claim 1 including a covering member mounted on said blower casing tangential outlet for impeding outflow of gas through a respective plenum chamber outlet into the respective plenum chamber, said covering member including an adjustable gate for varying the effective size of said blower casing tangential outlet.

3. In a bag filter device as set forth in claim 1 wherein said ratchet means includes:

a. a striker plate mounted on said wall means defining said circular track and extending across the path of said track, said track and said striker plate being corotatable;

b. said plenum chamber outlet defining wall means comprising stationary indexing members each positioned adjacent a respective one of the plenum chamber outlets;

c. an axle member mounted on said blower casing and extending therefrom; and d. a cross bar rotatably mounted on said axle member and having radially extending arms engageable simultaneously with said track and one of said indexing members, said arms being disengaged simultaneously from said track and an indexing member upon continued rotation of said track and said striker plate, said arms re-engaging said track and an adjacent indexing member upon further rotation of said track and said striker plate whereby said blower casing is partially revolved upon said disengagement of said cross bar and said blower casing is nonrevolvable upon engagement of said cross bar with said track and one of said indexing members.

4. In a bag filter device as set forth in claim 3 wherein:

a. said axle member is radially spaced from a rotational axis of said blower casing; and b. the rotational axis of said blower casing and the rotational axis of said circular track are coaxial.

5. In a bag filter device having a housing defining a filter chamber having an inlet and an outlet and a multiplicity of filter bags therein for passage of a gas therethrough to be filtered, the improvement which comprises:

a. wall means defining a plurality of plenum chambers arranged in a radial patter, each plenum chamber being in flow communication with the interior of a plurality of said filter bags and having an outlet through which filtered gas is normally discharged after passing through said plurality of filter bags, b. a casing centrally located with respect to the radially patterened plenum chambers, said casing being rotatably mounted with respect to said plenum chambers and having an inlet for reverse cleaning gas and a tangential gas outlet sequentially alignable with said plenum chamber outlets upon rotation of said casing, means urging reverse cleaning gas into said casing inlet and out said tangential gas outlet, said tangential gas outlet, upon discharge of reverse cleaning gas therefrom into said plenum chambers, inducing free rotation of said casing with respect to said plenum chambers; and c. means mounted on said casing and engageable with means positioned adjacent and cooperating with said wall means defining said plenum chambers for intermittently retaining said casing outlet sequentially in alignment with a respective chamber outlet against the rotation urged by expulsion of gas from said tangential gas outlet.

* * * * *